(12) United States Patent
Tiller et al.

(10) Patent No.: US 9,901,087 B2
(45) Date of Patent: Feb. 27, 2018

(54) HAND REEL FOR A FISHING LINE

(71) Applicant: Tiller & Tiller Pty Limited, Annandale (AU)

(72) Inventors: Robert Bruce Tiller, Balmain (AU); Brandon Liew, Chatswood (AU)

(73) Assignee: Tiller & Tiller Pty Limited, Annandale (AU)

( * ) Notice: Subject to any disclaimer, the term of this patent is extended or adjusted under 35 U.S.C. 154(b) by 196 days.

(21) Appl. No.: 14/783,074

(22) PCT Filed: Apr. 2, 2014

(86) PCT No.: PCT/AU2014/000349
§ 371 (c)(1),
(2) Date: Oct. 7, 2015

(87) PCT Pub. No.: WO2014/165899
PCT Pub. Date: Oct. 16, 2014

(65) Prior Publication Data
US 2016/0044904 A1    Feb. 18, 2016

(30) Foreign Application Priority Data
Apr. 8, 2013   (AU) ................ 2013901183

(51) Int. Cl.
*A01K 89/01*   (2006.01)
*A01K 89/08*   (2006.01)
*A01K 97/06*   (2006.01)

(52) U.S. Cl.
CPC ............. *A01K 89/08* (2013.01); *A01K 97/06* (2013.01)

(58) Field of Classification Search
CPC .. A01K 89/00; A01K 89/01121; A01K 89/08; A01K 89/003; A01K 97/06
USPC ...... 242/400.1, 405, 405.1, 407, 407.1, 606, 242/606.1, 610.6
See application file for complete search history.

(56) References Cited

U.S. PATENT DOCUMENTS 2,547,253 A *  4/1951  Bowers ................. A01K 97/06
                                                                    225/44
3,010,673 A    11/1961  Marconi
(Continued)

FOREIGN PATENT DOCUMENTS

EP        0160958 A1    11/1985
JP      2006-94755 A     4/2006
(Continued)

OTHER PUBLICATIONS

ISR for PCT/AU2014/000349 dated May 14, 2014.
(Continued)

*Primary Examiner* — Emmanuel M Marcelo
(74) *Attorney, Agent, or Firm* — Ladas & Parry, LLP

(57) ABSTRACT

A hand reel (10) for a fishing line. The reel (10) including a body (11) and a retaining member (12). The body (11) defines a channel (15) for receiving the fishing line. The retaining member (12) is attached to, or forms part of, the body (11). The retaining member (11) includes a lip portion (17) operable between an open position and a closed position. In the closed position, the lip portion (17) cooperates with the body (11) to substantially enclose the channel (15). In the open position, the lip (17) portion allows access to the channel (15).

19 Claims, 6 Drawing Sheets

(56) References Cited

U.S. PATENT DOCUMENTS

| | | | | |
|---|---|---|---|---|
| 3,540,143 | A * | 11/1970 | Zemba | A01K 97/06 43/57.1 |
| 3,762,592 | A * | 10/1973 | Mayes | A01K 89/00 206/315.11 |
| 3,952,965 | A * | 4/1976 | Falcon | A01K 89/08 242/396.7 |
| 4,522,349 | A * | 6/1985 | Clerk | A01K 89/08 242/395 |
| 4,688,740 | A * | 8/1987 | Weeks | A01K 89/08 242/229 |
| 4,702,035 | A * | 10/1987 | Palm | A01K 97/06 242/405.1 |
| 4,883,238 | A * | 11/1989 | Harder | A01K 89/016 24/127 |
| 5,123,199 | A * | 6/1992 | Lysohir | A01K 97/06 43/25.2 |
| 5,501,029 | A * | 3/1996 | McDaniel, Sr. | A01K 89/00 206/315.11 |
| 5,956,885 | A * | 9/1999 | Zirbes | A01K 89/00 43/26 |
| 6,070,825 | A | 6/2000 | Rich | |
| 2002/0189152 | A1 * | 12/2002 | Barnett, Jr. | A01K 97/06 43/57.1 |
| 2008/0173751 | A1 * | 7/2008 | Kimura | A01K 97/06 242/586.6 |
| 2010/0213304 | A1 * | 8/2010 | McCall | A01K 97/06 242/579 |
| 2012/0151819 | A1 * | 6/2012 | Solis | A01K 97/06 43/54.1 |
| 2012/0255218 | A1 * | 10/2012 | Haroian | A01K 97/06 43/54.1 |
| 2013/0031823 | A1 * | 2/2013 | Arias | A01K 97/06 43/54.1 |
| 2013/0264407 | A1 * | 10/2013 | McLeod | A01K 89/00 242/310 |
| 2015/0143740 | A1 * | 5/2015 | Kelly | A01K 97/06 43/54.1 |

FOREIGN PATENT DOCUMENTS

| | | |
|---|---|---|
| JP | 2008-86221 A | 4/2008 |
| WO | 89/01285 A1 | 2/1989 |

OTHER PUBLICATIONS

PCT International Written Opinion from PCT/AU2014/000349 dated May 14, 2014.

PCT International Preliminary Report on Patentability (Chapter I) with Written Opinion from PCT/AU2014/000349 dated Oct. 13, 2015.

Extended European Search Report from EPO Patent Application No. 14782289.4 dated Nov. 30, 2016.

* cited by examiner

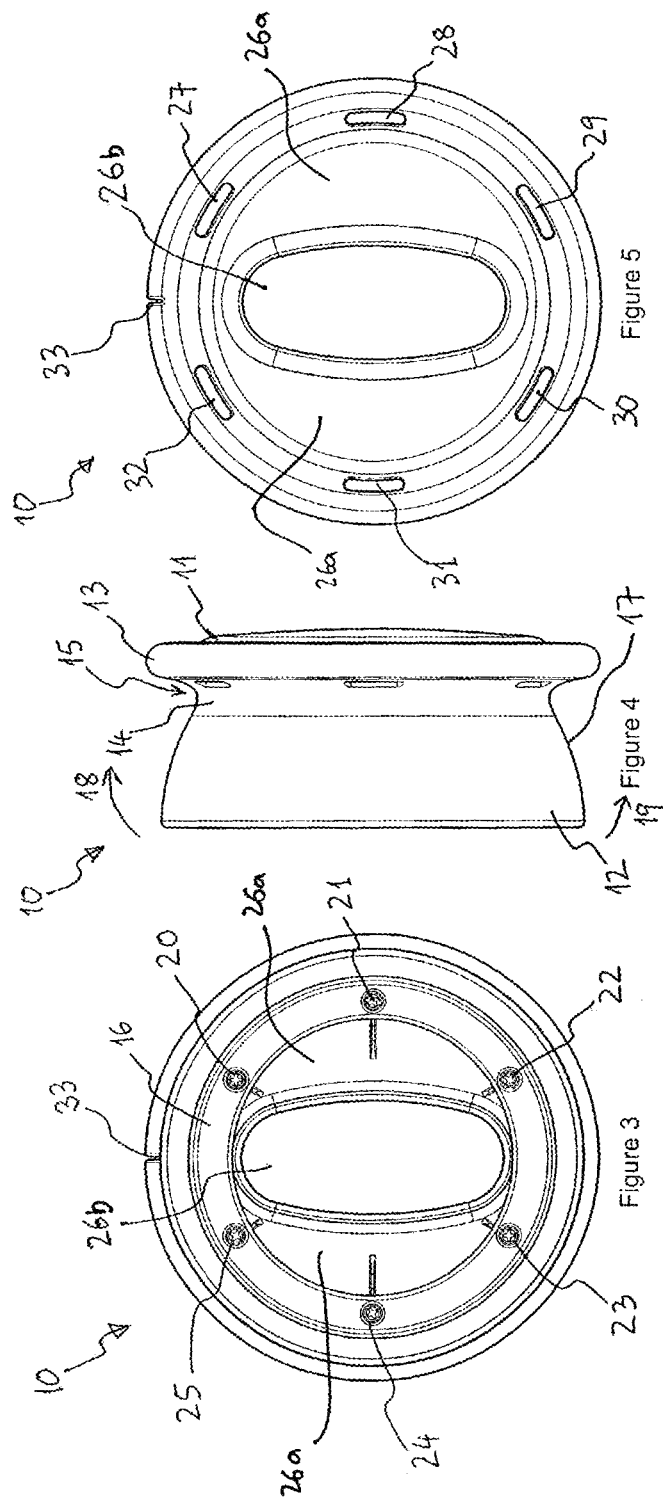

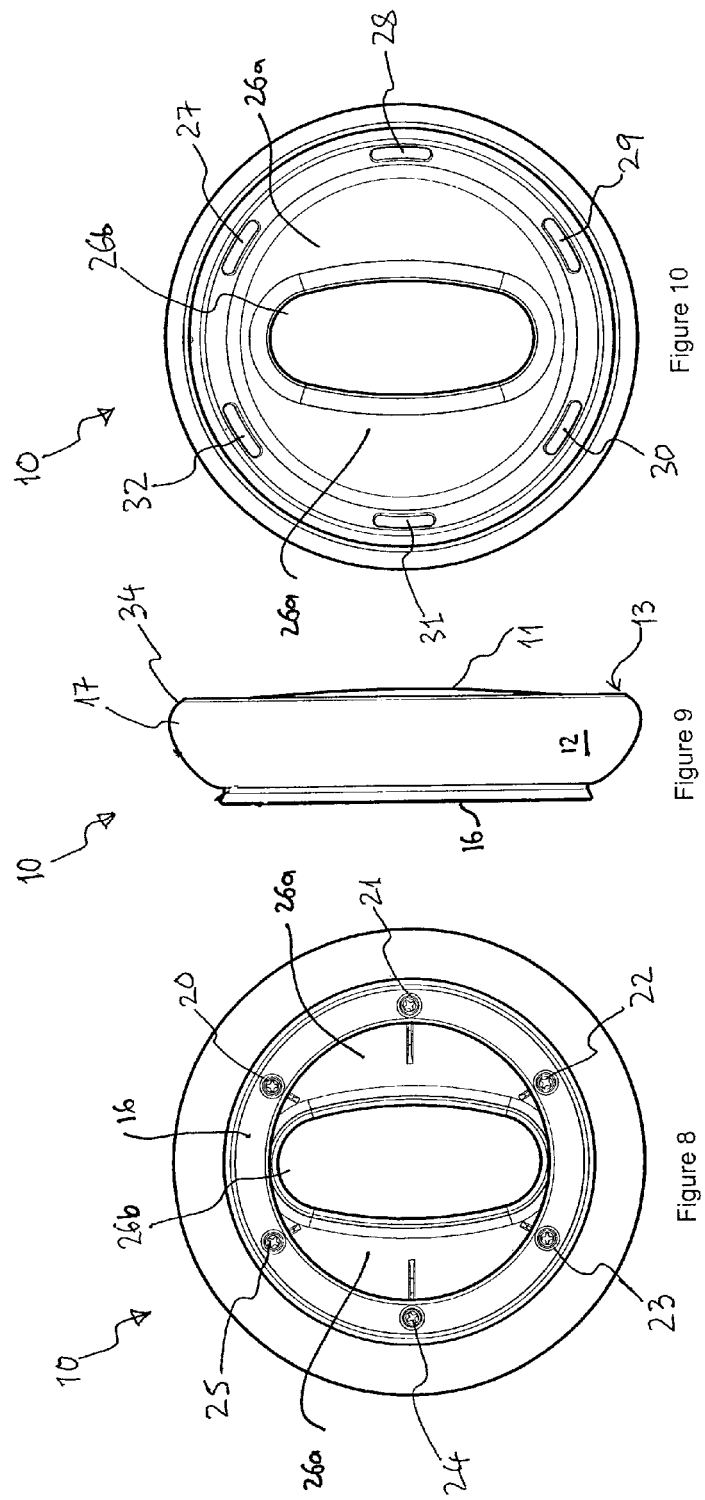

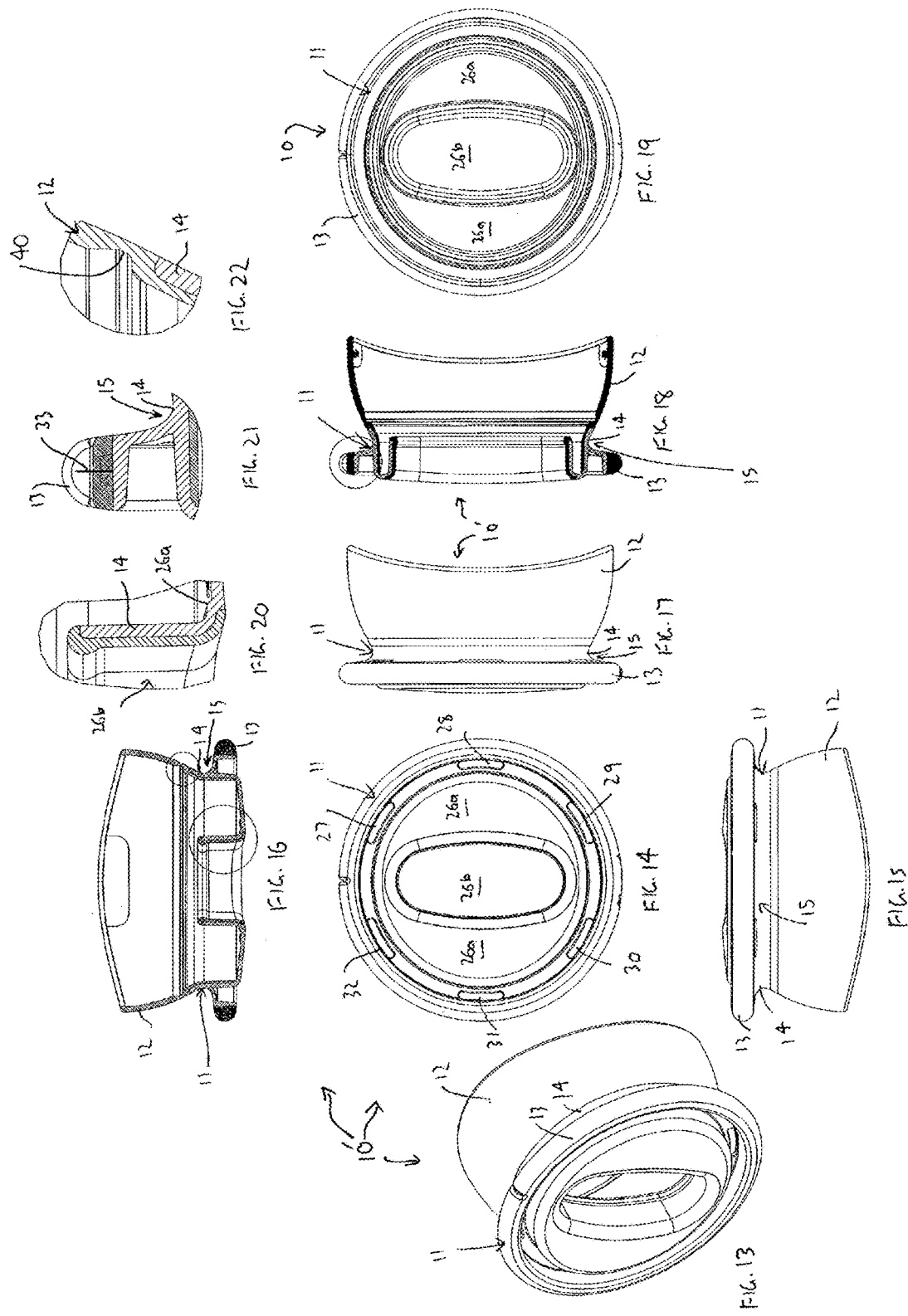

HAND REEL FOR A FISHING LINE

CROSS-REFERENCE TO RELATED APPLICATIONS

This application is the U.S. National Stage of International Patent Application No. PCT/AU2014/000349 filed on Apr. 2, 2014, which claims priority to and the benefit of Australian Provisional Application No. 2013901183 filed on Apr. 8, 2013, the disclosures of which are hereby incorporated by reference in their entirety.

FIELD

The present invention relates a fishing reel of the hand reel type, which is also known as a hand caster reel.

BACKGROUND

Hand reels are known and are used with one end of a fishing line secured to the reel and the other end connected to one or more hooks. Other accessories such as floats, lures, etc. may also be attached to the fishing line. A hand reel is not used with a fishing rod.

A disadvantage of known hand reels is that they leave the hooks, floats, lures, etc. exposed after the fishing line has been wound around the reel. Such exposed items are an injury risk, are untidy for storage, can entangle with the fishing line and other objects and create mess. It is time consuming and considered impractical to remove the accessories, store them separately, and re-attach them to the fishing line at the next use. Another disadvantage of known hand reels is that they are bulky and can occupy significant storage space.

OBJECT

It is the object of the present invention to substantially overcome or at least ameliorate one or more of the above disadvantages, or to at least provide a useful alternative.

SUMMARY OF INVENTION

Accordingly, the present provides a hand reel for a fishing line, the reel including:

a body defining a channel for receiving the fishing line; and a retaining member attached to, or forming part of, the body, the retaining member including a lip portion operable between an open position and a closed position, wherein, in the closed position, the lip portion cooperates with the body to substantially enclose the channel and, in the open position, allows access to the channel.

The retaining member preferably further includes a base portion connected to the lip portion, the base portion being attached to, or forming part of, the body adjacent to the channel.

The lip portion is preferably flexible relative to the base portion between the open and closed positions. The lip portion is preferably stable in the open and closed positions.

The body preferably includes a rim contiguous with the channel on a side opposite to the base portion of the retaining member, and, in the closed position, the lip portion circumferentially abuts the rim for enclosing the channel.

The retaining member is preferably formed from a relatively flexible, elastomeric thermoplastic or elastomeric thermoset material, such as silicon, or TPE.

The body is preferably formed from a relatively rigid thermoplastic material, such as polypropylene.

The retaining member is preferably removably attached to the body. The retaining member is preferably fixed to the body. The retaining member is preferably co-moulded with the body.

The body preferably further comprises at least one hole formed adjacent to the channel for mounting a hook attached to the fishing line.

The lip portion preferably includes a wasted peripheral region adapted to facilitate flexure of the lip portion between the open position and the closed position and vice versa. The wasted peripheral region is preferably positioned just inboard of the channel in the body. The wasted peripheral region is preferably in the form of a peripheral groove in the lip portion.

BRIEF DESCRIPTION OF DRAWINGS

Preferred forms of the present invention will now be described, by way of examples only, with reference to the accompanying drawings wherein:

FIG. 3 shows a front view of the fishing reel of FIG. 1;

FIG. 4 shows a side view of the fishing reel of FIG. 1;

FIG. 5 shows a back view of the fishing reel of FIG. 1;

FIG. 8 shows a front view of the fishing reel of FIG. 6;

FIG. 9 shows a side view of the fishing reel of FIG. 6;

FIG. 10 shows a back view of the fishing reel of FIG. 6;

FIG. 13 shows a perspective view of a second embodiment of a fishing reel, in an open state;

FIG. 14 shows a back view of the fishing reel of FIG. 13;

FIG. 15 shows a bottom view of the view of the fishing reel of FIG. 13;

FIG. 16 shows a cross sectional view of the fishing reel of FIG. 15;

FIG. 17 shows a side view of the fishing reel of FIG. 13;

FIG. 18 shows a cross sectional view of the fishing reel of FIG. 17;

FIG. 19 shows a front view of the fishing reel of FIG. 13;

FIG. 20 shows an enlarged detail view from FIG. 16;

FIG. 21 shows an enlarged detail view from FIG. 18; and

FIG. 22 shows an enlarged detail view from FIG. 16;

DESCRIPTION OF EMBODIMENTS

Figure 1:
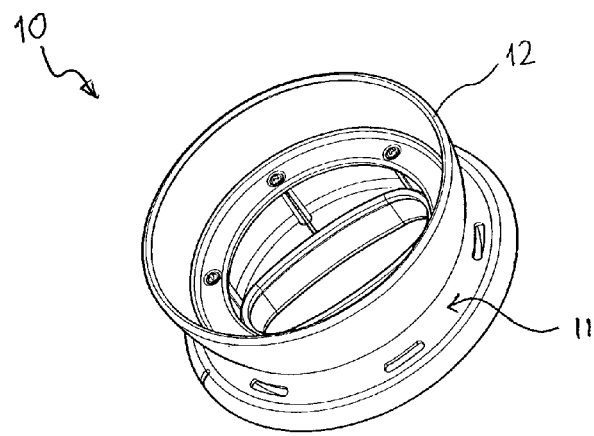
FIG. 1 shows a perspective view of a first embodiment of a fishing reel, in an open state.

FIGS. 1 to 5 depict a first embodiment of a hand reel 10. The reel 10 is shown in an "open" state (which will be described in more detail below) in which a fishing line (not shown) can be wound on and off the reel 10.

The fishing reel 10 includes a body 11 and a retaining member 12 attached to the body 11. The body 11 is injection moulded from a relatively rigid thermoplastic material, such as polypropylene. The retaining member 12 is injection or compression moulded from a relatively flexible, elastomeric thermoplastic, thermoplastic elastomer, or elastomeric thermoset material, such as silicon. The retaining member 12 has Shore A durometer hardness in the range of 30-50, preferably about 40.

The body 11 is generally disc-shaped, and includes a rim 13 and an annular neck 14 (see FIG. 4) that is contiguous with the rim 13. The annular neck 14 forms an outwardly concave, peripheral channel 15 where the fishing line can be wound.

The retaining member 12 is attached to the annular neck 14 of the body 11 on a side opposite to the rim 13. The retaining member 12 includes an annular base portion 16 and a lip portion 17 integrally formed to the base portion 16. The base portion 16 is removably attached to the neck 14 by a plurality of screws 20, 21, 22, 23, 24, 25.

The lip portion 17 is flexible between an open position and a closed position corresponding to the open state (e.g. for use) and closed state (e.g. for storage) of the fishing reel 10, line and hook(s)/accessories. The lip portion 17 is stable in both of these positions. The retaining member 12 is flexible and moulded in a stable position in the shape of the bowl, in the ready for use position. The retaining member 12 holds this shape with minimal tension in either the outer or inner surface. Put another way, the inner and outer surfaces are stable and not under any external stress through movement with their surface tension (both inner and outer) being stable.

Figure 12:
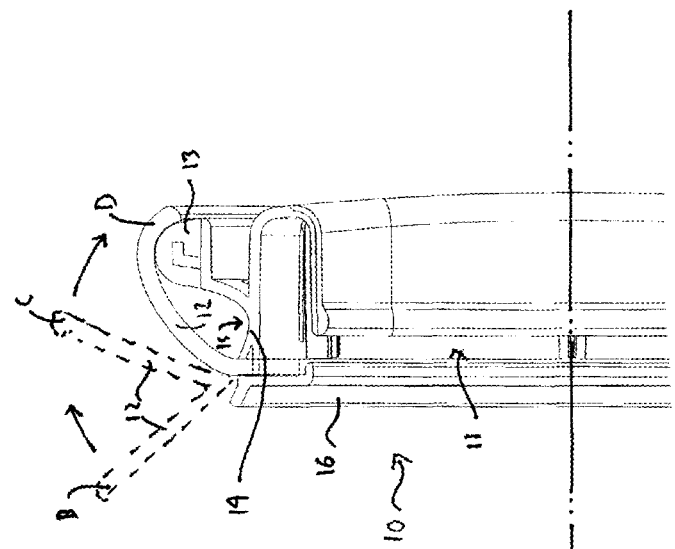
FIG. 12 shows a partial cross sectional view of the fishing reel of FIG. 9.
Figure 11:
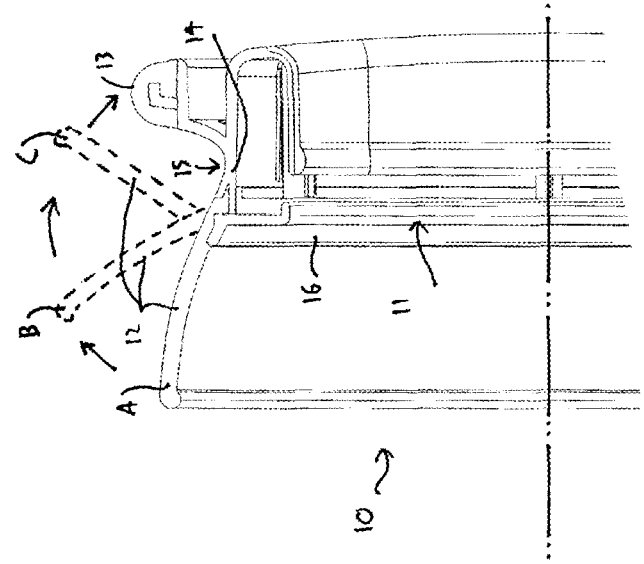
FIG. 11 shows a partial cross sectional view of the fishing reel of FIG. 4.

As best shown in FIGS. 11 and 12, when the retaining member 12 is manually folded inwardly (from A towards B) toward the body 11 of the reel 10, the moulded shape (A) is subjected to surface tension and compression. This reaches a tipping point where the form inverts (from B towards C) until the retaining member 12 closes around the body 11 (D) on the other side of the body 11 where the channel 15 holding the fishing line is located.

The retaining member 12 will holds the position/shape D shown in FIG. 12 as the surface of the retaining member 12 has compression forces from the inner surface (when its shape inverts) pushing its material against and into the rim 13 of the body 11. If the rim 13/body 11 were not present, the retaining member 12 would return to the bowl shaped stable position/shape D on the opposite side to that which it started.

The action driving this change in position and shape is the input of manual energy from a user, which compresses the outer surface of the retaining member 12 and stretches the inner surface of the stable bowl shape (A) when the reel 10 is in the open/ready to use position. When moved from its stable position (A) it is unstable and the elastomeric material wants to move to a stable or neutral position (A or D). The bowl shaped retaining member 12 reaches a tipping point where the outer compressed surface and the inner stretched surface invert the bowl shape, as the surface tension in each side moves to stabilise the shape. As the rim 13/body 11 blocks the ability of the retaining member 12 to completely invert, it is held against the rim 13/body 11 with some surface tension in its outer surface and inner surface. A reverse of the above operation occurs when the retaining member 12 is flexed from the closed position (D) back to the open position (A). Put another way, the retaining member is movable between the stable open (A) and closed (D) positions in a manner akin to an over-centre mechanism.

The outer peripheral edge of the retaining member 12 distorts as it stretches the furthest to reach the tipping point before inverting, without over stressing or rupturing its elastomeric material.

In the open position, as shown in FIGS. 1 to 5, the lip portion 17 is in a shape of a bowl or a truncated inverted cone that extends generally outwardly from the channel 15. This helps to guide the fishing line into the channel 15 during winding in, and out of the channel 15 during releasing. From the open position, the lip portion 17 can be flexed relative to the base portion 16 toward the rim 13 of the body 11, in the direction shown by arrows 18, 19 (see FIG. 4), in order to switch to the closed position.

As shown in FIGS. 6 to 10, in the closed position, the lip portion 17 of the retaining member 12 abuts the whole circumference of the rim 13, thereby substantially enclosing the channel 15. The lip portion 17 is sized to provide overlapping contact between the lip portion 17 and the rim 13 in the closed position.

Figure 2:
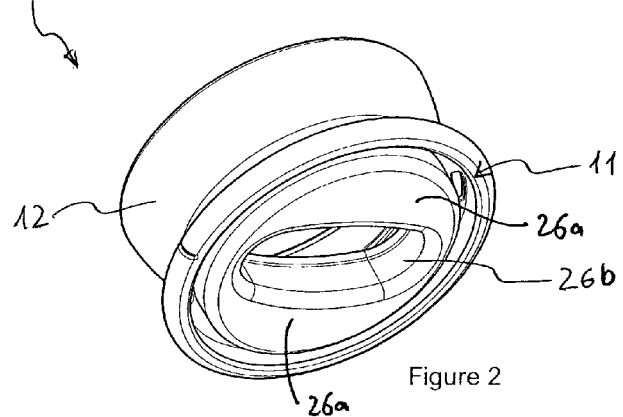
FIG. 2 shows an alternate perspective view of the fishing reel of FIG. 1.
Figure 6:
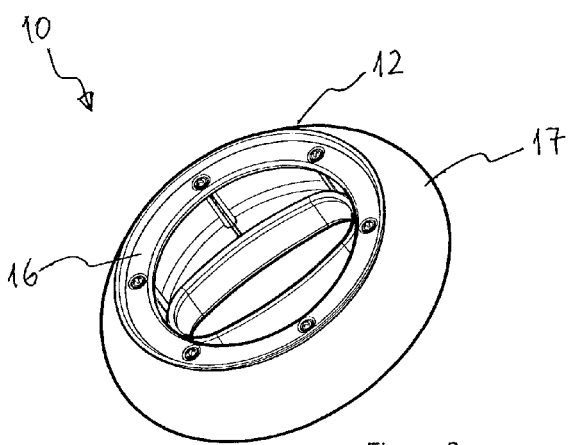
FIG. 6 shows a perspective view of the fishing reel of FIG. 1 in a closed state.
Figure 7:
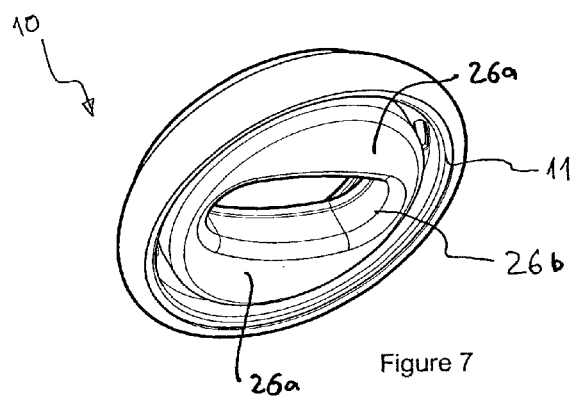
FIG. 7 shows an alternate perspective view of the fishing reel of FIG. 6.

As shown in FIGS. 2 and 5, the body 11 also includes handle means in the form of flanges 26a either side of an oblong opening 26b. In use, the user may insert his fingers into the opening 26b to grasp the flanges 26a and thus the body 11. The oblong shape of the opening 26b helps to restrict angular movements of the body 11 relative to the fingers.

The body 11 also includes one or more slotted holes 27, 28, 29, 30, 31, 32 adjacent to the channel 15, allowing a hook (not shown) attached to one end of the fishing line to be securely mounted. The body 11 also includes a fishing line cutter 33 (see FIGS. 3 and 5), being a moulded blade within a slot on the rim 13.

FIGS. 6 to 10 show various views of the reel 10 in the closed state, in which the lip portion 17 of the retaining member 12 is in the closed position, e.g. after the fishing line has been wound. As illustrated, the lip portion 17 is flexed toward the rim 13 of the body 11, and circumferentially abuts the rim 13. As the lip portion 17 is elastic, a tight contact is formed between the lip portion 17 and the rim 13, thereby substantially enclosing the channel 15 (FIG. 4). As a result, the fishing line and attached accessories such as hooks, floats, lures, etc. can be neatly and securely contained within the channel 15. Risks of injuries by accidental pricks by the hooks are reduced or eliminated. The whole fishing reel 10 can also be conveniently stored or carried without requiring additional containers for the accessories.

From the closed position as shown in FIGS. 6 to 10, the lip portion 17 can be disengaged from the rim 13, e.g. by pulling the lip portion 17 toward the fore side of the rim 13 nearer to the neck 14, to switch back to the open position. As the engaging member 12 is made from an elastic material, the lip portion 17 can be flexed back and forth multiple times without damage.

FIGS. 13 to 22 depict a second embodiment of a hand reel 10'. The hand reel 10' is very similar to the hand reel 10 shown in FIGS. 1 to 12 and like features are indicated with like reference numerals. However, as best shown in FIG. 22, the reel 10' includes a wasted peripheral region, in the form of a peripheral groove 40, in the lip portion 17 of the retaining member 11. The groove 40 assists in the consistent flexure of the lip portion 17 between the open position and the closed position and vice versa, particularly the over-centre mechanism type action that the lip portion 17 undergoes when being moved between the open and closed positions. The groove 40 is positioned just inboard of the channel 15 in the body 11.

In addition, as best shown in FIG. 21, the cutter 33 in the reel 10' is in the form of a stainless steel blade co-moulded into the rim 13.

Further, as best shown in FIGS. 17 and 18, the lip portion 17 when viewed from the side has an outwardly concave shape. This assists in locating the reel 10' on a user's body under an arm, leaving both hands free to handle hooks, lines, bait or fish etc.

The fishing reels described above have many advantages. Firstly, they provide a simple and cost-effective solution to the problems associated with winding a fishing line together with accessories such as hooks, floats, lures, etc. The respective components can also be adapted for different sizes and lengths of the fishing line. The size of the reel is also reduced in the closed position/state, which is an advantage during storage. The (relatively soft) material of the lip portion also provide friction or grip to the reel when it sits on a surface (open or closed) which helps it to remain where placed, which is particularly advantageous when fishing from a boat. The opening in the body is also helpful in locating the reel on a branch, pole or the like. The lip portion is also helpful after a line has been cast as then placing it in the closed position causes it to provide a dragging action on the line to prevent unintentional line running (e.g. due to wind or fish strike etc.).

Although the invention has been described with reference to a preferred embodiment, it will be appreciated by persons skilled in the art that the invention may be embodied in many other forms. For example, the retaining member may be fixed to the body. The retaining member can also be co-injection moulded with the body.

The invention claimed is:

1. A hand reel for a fishing line for use in fishing by hand, the hand reel including:
    a body defining a channel for receiving the fishing line, and including an opening configured for a user to insert a finger for grasping and holding the hand reel while fishing; and
    a retaining member attached to, or forming part of, the body, the retaining member including a lip portion operable between an open position and a closed position,
    wherein, in the closed position, the lip portion cooperates with the body to substantially enclose the channel and, in the open position, allows access to the channel.

2. The hand reel as claimed in claim 1, wherein the retaining member further includes a base portion connected to the lip portion, the base portion being attached to, or forming part of, the body adjacent to the channel.

3. The hand reel as claimed in claim 2, wherein the lip portion is flexible relative to the base portion between the open and closed positions.

4. The hand reel as claimed in claim 3, wherein the lip portion is stable in the open and closed positions.

5. The hand reel as claimed in claim 2, wherein the body includes a rim contiguous with the channel on a side opposite to the base portion of the retaining member, and, in the closed position, the lip portion circumferentially abuts the rim for enclosing the channel.

6. The hand reel as claimed in claim 1, wherein the retaining member is formed from a relatively flexible, elastomeric thermoplastic or elastomeric thermoset material.

7. The hand reel as claimed in claim 1, wherein the retaining member has a Shore A durometer hardness in the range of 30-50.

8. The hand reel as claimed in claim 1, wherein the retaining member has a Shore A durometer hardness of about 40.

9. The hand reel as claimed in claim 1, wherein the body is formed from a relatively rigid thermoplastic material.

10. The hand reel as claimed in claim 1, wherein the retaining member is fixed to the body.

11. The hand reel as claimed in claim 1, wherein the retaining member is removably attached to the body.

12. The hand reel as claimed in claim 1, wherein the retaining member is co-moulded with the body.

13. The hand reel as claimed in claim 1, wherein the body further comprises at least one hole formed adjacent to the channel for mounting a hook attached to the fishing line.

14. The hand reel as claimed in claim 1, wherein the lip portion includes a wasted peripheral region adapted to facilitate flexure of the lip portion between the open position and the closed position and vice versa.

15. The hand reel as claimed in claim 14, wherein the wasted peripheral region is positioned just inboard of the channel in the body.

16. The hand reel as claimed in claim 14, wherein the wasted peripheral region is in the form of a peripheral groove in the lip portion.

17. A hand reel for a fishing line for use in fishing by hand, the hand reel including:
    a body defining a channel for receiving the fishing line, and including an opening configured for a user to insert a hand for grasping and holding the hand reel in use; and
    a retaining member attached to, or forming part of, the body, the retaining member including a lip portion operable between an open position and a closed position,
    wherein, in the closed position, the lip portion cooperates with the body to substantially enclose the channel and, in the open position, allows access to the channel.

18. The hand reel as claimed in claim 17, wherein the retaining member further includes a base portion connected to the lip portion, the base portion being attached to, or forming part of, the body adjacent to the channel, wherein the body includes a rim contiguous with the channel on a side opposite to the base portion of the retaining member, and, in the closed position, the lip portion circumferentially abuts the rim for enclosing the channel.

19. The hand reel as claimed in claim 17, wherein the body is formed from a relatively rigid thermoplastic material and the retaining member is formed from a relatively flexible, elastomeric thermoplastic or elastomeric thermoset material.

* * * * *